May 16, 1967 H. H. AIKEN ETAL 3,319,761
AUTOMATIC +X-AXIS DETECTOR, MARKER, SORTER AND
COLLECTOR FOR CRYSTAL WAFER BLANKS
Filed Jan. 25, 1965 7 Sheets-Sheet 1

INVENTORS.
HOWARD H. AIKEN
ROBERT W. BIRRELL
MAYNARD W. RICHARDS
JAMES B. CUMMINS
BY Sughrue, Rothwell, Mion, Zinn & Macpeak
ATTORNEYS.

May 16, 1967

H. H. AIKEN ET AL 3,319,761

AUTOMATIC +X-AXIS DETECTOR, MARKER, SORTER AND
COLLECTOR FOR CRYSTAL WAFER BLANKS

Filed Jan. 25, 1965

FIG. 4

INVENTORS.
HOWARD H. AIKEN
ROBERT W. BIRRELL
MAYNARD W. RICHARDS
JAMES B. CUMMINS

BY ATTORNEYS.

May 16, 1967

H. H. AIKEN ETAL 3,319,761

AUTOMATIC +X-AXIS DETECTOR, MARKER, SORTER AND
COLLECTOR FOR CRYSTAL WAFER BLANKS

Filed Jan. 25, 1965

INVENTORS.
HOWARD H. AIKEN
ROBERT W. BIRRELL
MAYNARD W. RICHARDS
JAMES B. CUMMINS

BY Sughrue, Rothwell, Mion, Zinn & Macpeak

ATTORNEYS.

May 16, 1967 H. H. AIKEN ETAL 3,319,761
AUTOMATIC +X-AXIS DETECTOR, MARKER, SORTER AND
COLLECTOR FOR CRYSTAL WAFER BLANKS
Filed Jan. 25, 1965 7 Sheets-Sheet 6

INVENTORS.
HOWARD H. AIKEN
ROBERT W. BIRRELL
MAYNARD W. RICHARDS
JAMES B. CUMMINS

Sughrue, Rothwell, Mion, Zinn & Macpeak
BY ATTORNEYS.

May 16, 1967 H. H. AIKEN ETAL 3,319,761
AUTOMATIC +X-AXIS DETECTOR, MARKER, SORTER AND
COLLECTOR FOR CRYSTAL WAFER BLANKS
Filed Jan. 25, 1965 7 Sheets-Sheet 7

INVENTORS.
HOWARD H. AIKEN
ROBERT W. BIRRELL
MAYNARD W. RICHARDS
JAMES B. CUMMINS

BY *Sughrue, Rothwell, Mion, Zinn, & Macpeak*

ATTORNEYS.

United States Patent Office 3,319,761
Patented May 16, 1967

3,319,761
AUTOMATIC +X-AXIS DETECTOR, MARKER, SORTER AND COLLECTOR FOR CRYSTAL WAFER BLANKS
Howard H. Aiken and Robert W. Birrell, Carlisle, Pa., James B. Cummins, Silver Spring, Md., and Maynard W. Richards, York, Pa., assignors to Howard Aiken Industries, Carlisle, Pa., a corporation of Delaware
Filed Jan. 25, 1965, Ser. No. 427,574
20 Claims. (Cl. 198—31)

Crystals of quartz, either natural or synthetic, are in great demand in industry for innumerable electronic frequency control applications and other industrial uses. Hence there is a need for reliable mass production of these crystals in usable form.

In the production of crystal wafer blanks from quartz rocks, the quartz is cut into wafer blanks and then these blanks are further processed and sorted in accordance with certain properties. It is essential in the manufacture of piezo electrical crystal wafers that the surfaces of the wafer be properly oriented with respect to the axes of the mother quartz. Quartz being a true crystal, it has defined crystallographic axes. These are termed the Z or optical axis; the X or electrical axis and the Y or mechanical axis. At the present time, after quartz is cut into wafers of rectangular or other shape the +X-axis is determined and marked by manually rotating the crystal wafer on a plate with polarized light passing through it until a point of maximum light extinction is reached as determined by the operator. Then the wafer is marked to the operator's left with the marking at right angles to the beam. This is a tedious and time consuming manual operation with results related to the skill of the operator. The wafer blanks with their +X-axis marked are then further processed to determine the Z-axis by X-ray methods using the +X-axis as a reference with +X-axis at a predetermined angle with reference to the X-ray beam.

This invention provides an automatic method and machine which can automatically determine the X-axis (in both direction and sense) of a crystal wafer blank, sort or collect successive blanks with like X-axis orientation and, if desired, mark each crystal blank with its positive X-axis orientation.

Other objects of the invention will be pointed out in the following description and claims and illustrated in the accompanying drawings, which disclose, by way of example, the principle of the invention and the best mode which has been contemplated of applying that principle.

In the drawings:

FIG. 13 is an electrical circuit diagram of the control circuit utilized in this invention.

FIG. 15 is an illustration of photocell position as related to logic circuitry of the preferred embodiment;

In general, this invention provides a machine for automating the previously manual operation of determining and marking the positive X or electrical axis of quartz crystal wafer blanks, and sorting or collecting the crystal wafer blanks with like +X-axis orientation. The blanks are fed one at a time with random X-axis orientation to a detecting station on a sorting board. The +X-axis of a blank at the detecting station is automatically determined by passing polarized light through and across the blank and sensing the light extinction by photoelectric cells. The photoelectric cells are in turn connected in an electric control circuit which controls movement of the sensed crystal wafer blank from the detecting station to a collecting station so that all blanks at the collecting station have like +X-axis orientation. A marker may be provided for marking all blanks before they reach the collecting station. In a preferred form of this invention the movement of the blanks is along a chute conveyor with switches controlled by the electric control circuit to switch each like +X-axis blank into a like collecting station, there being four tracks at the conveyor discharge into four collecting stations, each having a removable magazine. In other embodiments, there may be only a single collecting station with orientation of the blanks being accomplished by multiple paths instead of sorting. Alternately, the orientation may be accomplished by rotary means instead of multiple paths.

Figure 1:
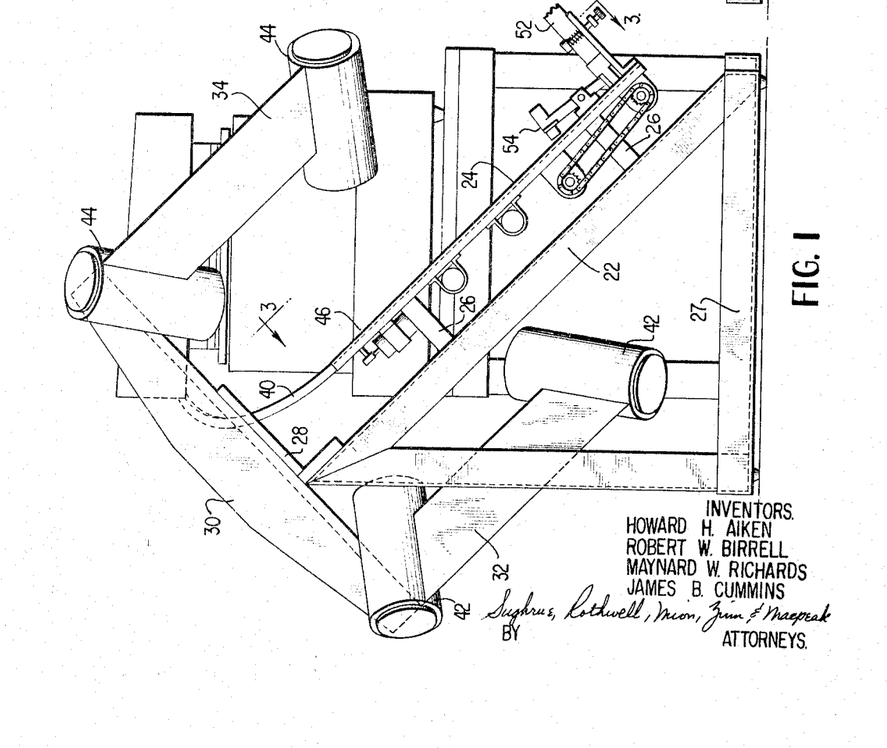
FIG. 1 is a side elevational view of the apparatus of this invention.
Figure 2:
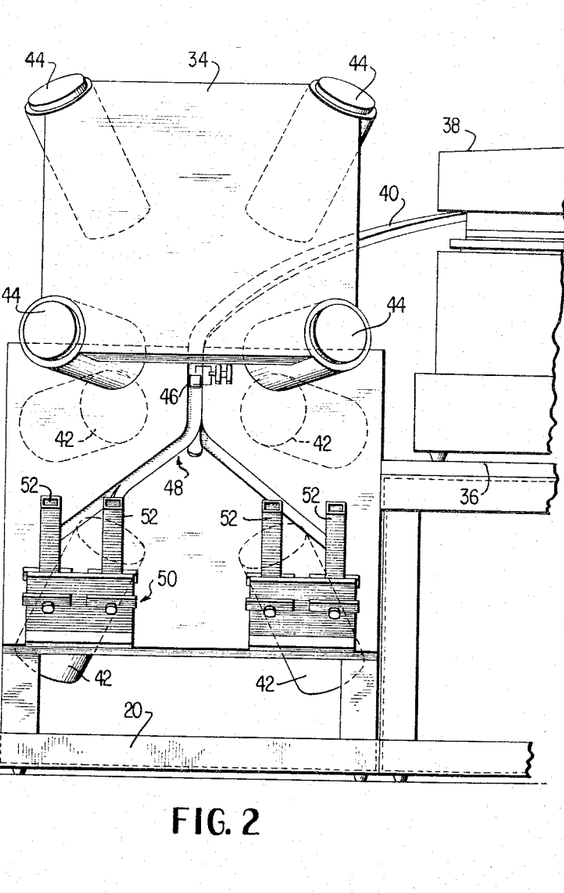
FIG. 2 is a front elevational view of the apparatus shown in FIG. 1.

Referring to FIGS. 1 and 2, the apparatus of this invention includes a support frame 20 having an inclined mounting surface 22 to which a detection, sorting and collecting board 24 is mounted by means of brackets 26, 26. An optical assembly support bracket 28 carried by the frame 20 mounts an optical assembly frame 30 which in turn carries a light housing 32 and a photocell housing 34, both outwardly identical. An adjacent table 36, FIG. 2, mounts a commercially available vibratory feeder apparatus 38 from which thin rectangular crystal wafer blanks are fed, one at a time by gravity down an inclined feed chute 40.

The heart of the apparatus of this invention is contained on the detection, sorting and collecting board 24 in combination with the contents of the light housing 32 and photocell housing 34. Each of the housings 32 and 34 are mounted in identical support frames which include four tubes 42, 42, 42, 42 and 44, 44, 44, 44 on each frame for housing light directing means and photocell responsive means for detecting the X-axis of unoriented crystal wafer blanks which have been fed one at a time down chute 40 to the board 24.

Figure 3:
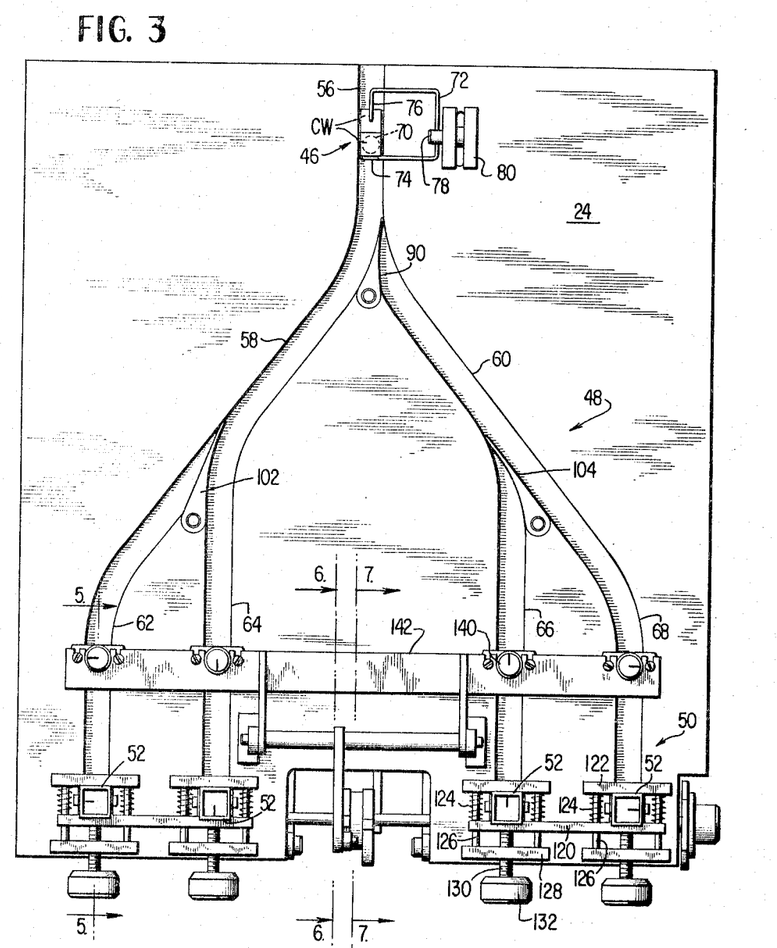
FIG. 3 is a top plan view of the apparatus of this invention using a marker and sorter which is a preferred embodiment of this invention.
Figure 4:
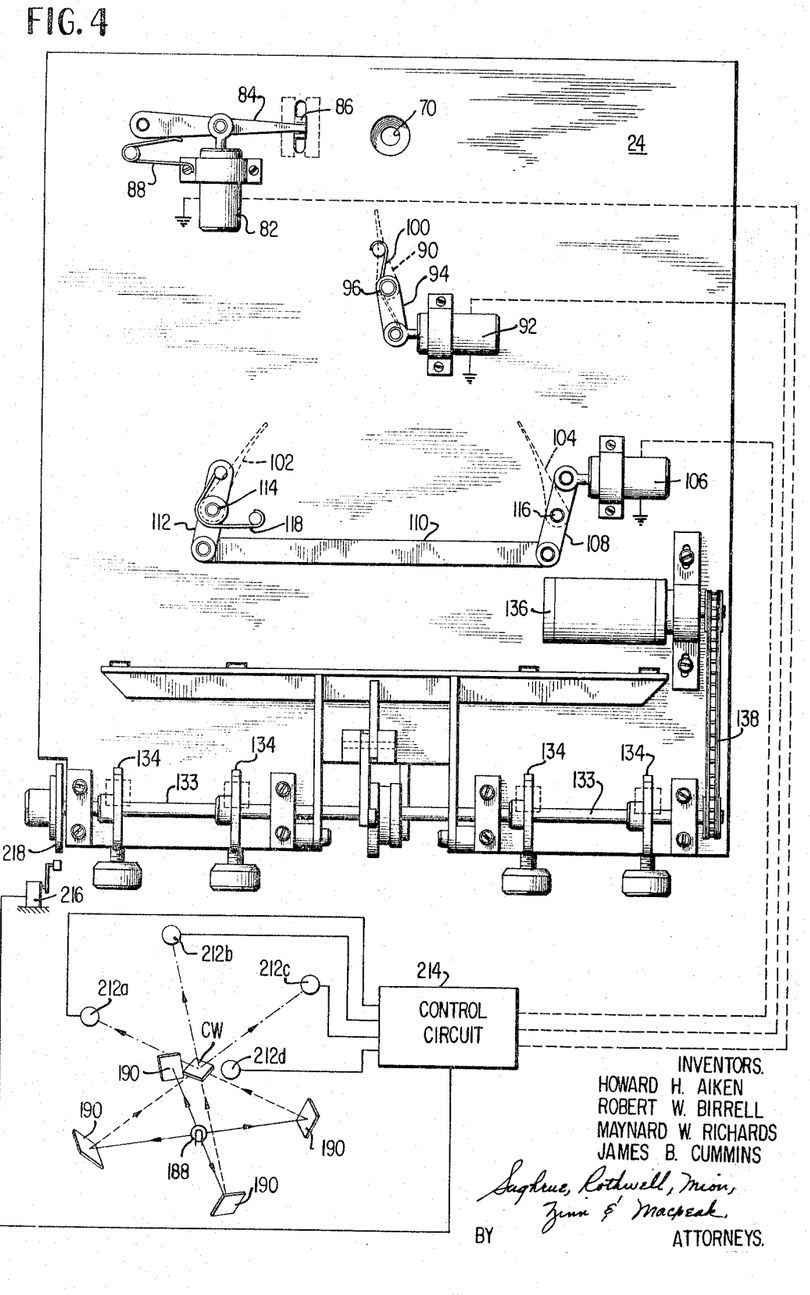
FIG. 4 is a bottom plan view of the detecting station and sorting board shown in FIG. 3 and further illustrating the optical detection system and means for controlling the sorter.

The board 24 as shown in FIGS. 3 and 4 includes a detection station 46 at which the crystal wafer blanks are held while light is directed through the blank from across its four corners and at an angle to the plane of the blank as is used in the art. The polarized light passing through the blank as shown in FIGS. 2 and 4 provokes a varying response of the various photocells in tubes 44, 44, 44, 44. The blank may be fed from detection station 46 along a conveying means 48 including in the preferred embodiment a plurality of preselectable conveying paths down to collecting station 50. In the preferred embodiment these collecting means are magazine assemblies 52, 52, 52, 52. The blanks also may be marked by marking means 54 between the detecting station 46 and the collecting station 50.

Reference may be had to FIGS. 3 and 4 for more details of the detecting station 46, conveying means 48, collecting means 50 and marking means 54. The board 24 is grooved to provide a chute conveyer for movement of the crystal wafer blanks while lying on their flat faces. This grooving includes an entrance groove 56 leading to the detecting station 46 and branching off into two branches 58 and 60 which in turn each branch off into two additional branches 62, 64, 66 and 68, leading to the collecting magazines 52, 52, 52, 52. Because the board 24 is mounted at an angle to the horizontal, as shown in FIG. 1, the crystal wafer blanks such as blank CW shown in FIG. 3 will slide by gravity down a selected one of the chutes or grooves 62, 64, 66 and 68 of the conveying means 48.

The detecting station 46 includes a window 70 or other suitable opening so that light rays from the light assembly 32 may be directed across the four corners of the blank to impinge upon the photocell assembly 34. During the detection of the X-axis the blanks CW are held stationary and the feeding of only one at a time to a position over window 70 is assured and controlled by oscillatable feed control arm 72 having a sensed blank stop finger 74 and a next fed blank stop finger 76. Arm 72 is mounted on shaft 78 which in turn is rotatably journaled on support 80. The drop of a blank from detecting station 46 is controlled by raising finger 74 by oscillating arm 72 by means of drop solenoid 82. The drop solenoid 82 has its armature connected to lever 84 which in turn cooperates with a yoke 86 for selective oscillation of arm 72. A spring 88 is provided to bias lever 84 and hence arm 72 to prevent the drop of the wafer until solenoid 82 is energized.

Referring to FIG. 3, the choice between tracks 58 and 60 is determined by a first level track switch 90. As shown in FIG. 4, first level switch 90 is controlled from a first level switching solenoid 92 mounted on the underside of board 24 and acting upon a lever arm 94 attached to rotatable post 96 which also mounts the switch blade 90. A spring 100 is provided for biasing the switch in accordance with the logic and control circuitry of the system.

After the crystal wafer has moved past switch blade 90 into one or the other of the chutes 58, a further choice is made in accordance with +X-axis detection to switch the wafer into one of the chutes 62, 64, 66 and 68. This is determined by second level switch blades 102 and 104 gang controlled by second level solenoid 106. The solenoid plunger operates on a lever 108 which in turn is connected to link 110 to pivot a further lever 112. Levers 108 and 112 are rigidly attached at their center to switch blade operating shafts 114 and 116. A spring 118 is provided for biasing the blades to a predetermined position.

Figures 5, 6, 7, 11, 12:
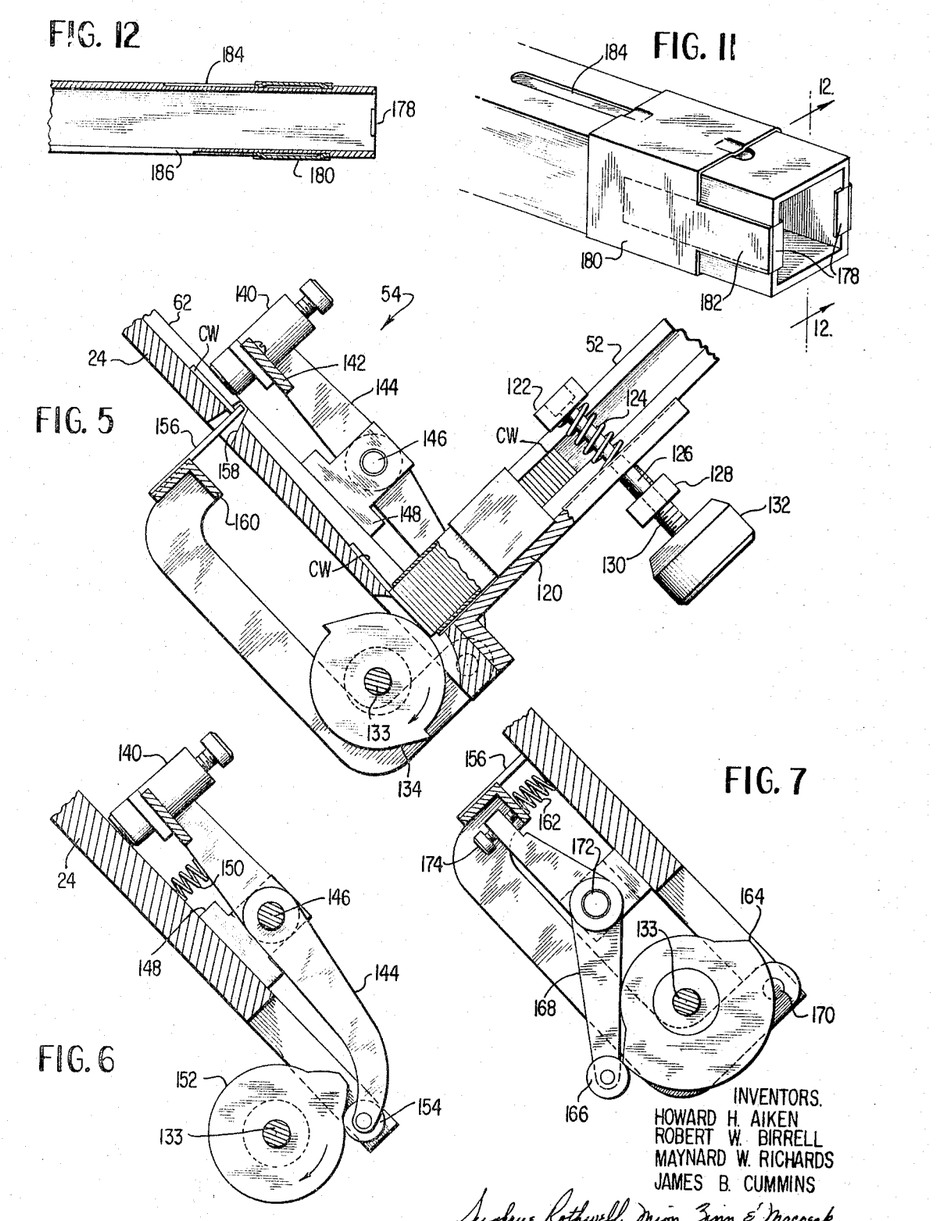
FIG. 5 is a detailed sectional view taken along the line 5—5 of FIG. 3.
FIG. 6 is a detailed sectional view taken along line 6—6 of FIG. 3.
FIG. 7 is a detailed sectional view taken along line 7—7 of FIG. 3.
FIG. 11 is a perspective view showing the blank collecting magazine in blank holding condition.
FIG. 12 is a further sectional view on line 12—12 of FIG. 11 of the blank collecting magazine.

Collection of the sorted blanks is accomplished in the collecting magazines 52 which are removably mounted by means of a clamping arrangement including a clamp bar 120 which is rigid with the board 24 and a movable clamp bar 122, see FIGS. 3 and 5. The movable clamp bar is biased to magazine releasing position by springs 124 surrounding rods 126. Rods 126 are connected by a cross-bar 128 which has a threaded hole for a clamping screw 130 having a knurled head 132. As can be seen, rotating the screw to thread it through bar 128 and against bar 120 draws movable clamping bar 122 into clamp on the upper side of magazine 52 as viewed in FIG. 3. Release of this clamping arrangement is accomplished by counter-rotation of knurled screw head 132.

Referring to FIG. 4, a drive shaft 133 has four cams 134 attached to it and each cam is mounted for pushing the crystal wafer blanks CW one at a time upwardly into the magazine 52 as shown in FIG. 5. The drive shaft 133 is driven from a motor 136 through a chain and sprocket drive 138 on the bottom side of the board as shown in FIG. 4.

FIG. 5 further shows the marking means 54 for marking each crystal wafer blank in accordance with the X-axis. It is not essential that the machine incorporate such marking means as in fact the marking may be done separately or the marking may be omitted entirely so long as all the blanks have like +X-axis orientation and are collected in the same magazine 52.

This marking means 54 includes a marker assembly 140 of a known type similar to a rubber stamp which has a single radial line thereon and is mounted to provide the marking lines 141 illustrated in FIG. 3. The marker assembly 140 for each track 62, 64, 66, 68 is secured on a bar 142 extending across the top of board 24 as shown in FIG. 3. The bar 142 is reciprocated up and down for marking by means of a lever arm 144 pivoted at 146 to a support 148, see FIG. 6. A spring 150 biases the markers 140 upwardly and they are driven down for marking by means of a cam 152 mounted on drive shaft 133 and cooperating with a cam follower roller 154 at the end of arm 144. Thus all four markers 140 go down on each cycle and each rotation of the drive shaft 133. However, a crystal wafer CW will be in position under only one of the four marking pen assemblies 140 after its +X-axis has been detected and it has been switched into one of the tracks 62, 64, 66, 68.

The detected and sorted crystal wafer CW is held in position to be marked by means of a stop finger 156 extending through a hole 158 in the board 24. The stop finger for each track is carried on a stop arm 160 and is normally biased out of intercepting position by means of spring 162. However, the stop finger 156 is driven into intercepting position, FIG. 5, by the arrangement of FIG. 7 including a cam 164 mounted on drive shaft 133, the cam cooperating with a cam follower roller 166 on arm 168 to oscillate the stop arm 160 and drive the finger 156 into blank intercepting position at a predetermined time in the cycle timed with the movement of the marker 140 down on to the stopped blank. The arm 160 is pivotally mounted at 170 for rocking movement under the influence of follower arm 168 which in turn is pivotally mounted at 172. Adjustment of the movement of the finger 160 may be accomplished by the adjusting screw 174, FIG. 7.

The magazines 52 which are used are capable of removal and independent retention of the sorted and collected crystal wafer blanks are shown in FIGS. 9–12. The magazine of FIGS. 9 and 10 has a rectangular shaped open end tubular body 176. For holding the blanks in the magazine as a stack there are provided a pair of fingers 178, 178 which are resilient and normally biased to a position to allow the bottom end of the magazine free access for the blanks to be stacked therein. However, the end of fingers 178, 178 may be pushed inwardly to retain the clips by covering a portion of the bottom of the magazine as shown in FIG. 11. For pushing the fingers 178, 178 inwardly there is provided a slide 180 guided for movement by slot 184 in the magazine and having a finger contacting portion 182. By moving the slide downwardly toward the end of the magazine the fingers 178 may be moved inwardly to retain the clips in the magazine. A viewing slot 186 may also be provided in the magazine. In this manner a magazine 52 may be filled to near the upper end with crystal wafer blanks CW having like +X-axis orientation, and then the clip 180 moved downwardly to retain the wafer blanks in the magazine and the magazine 52 may be bodily removed by unscrewing screw 130 and the stack of crystal wafer blanks having like X-axis orientation may be handled as a stack for further operations if desired. One such example of a further operation would be a separate marker utilizing magazines 52, in which case marking means 54 would be omitted.

Figure 8:
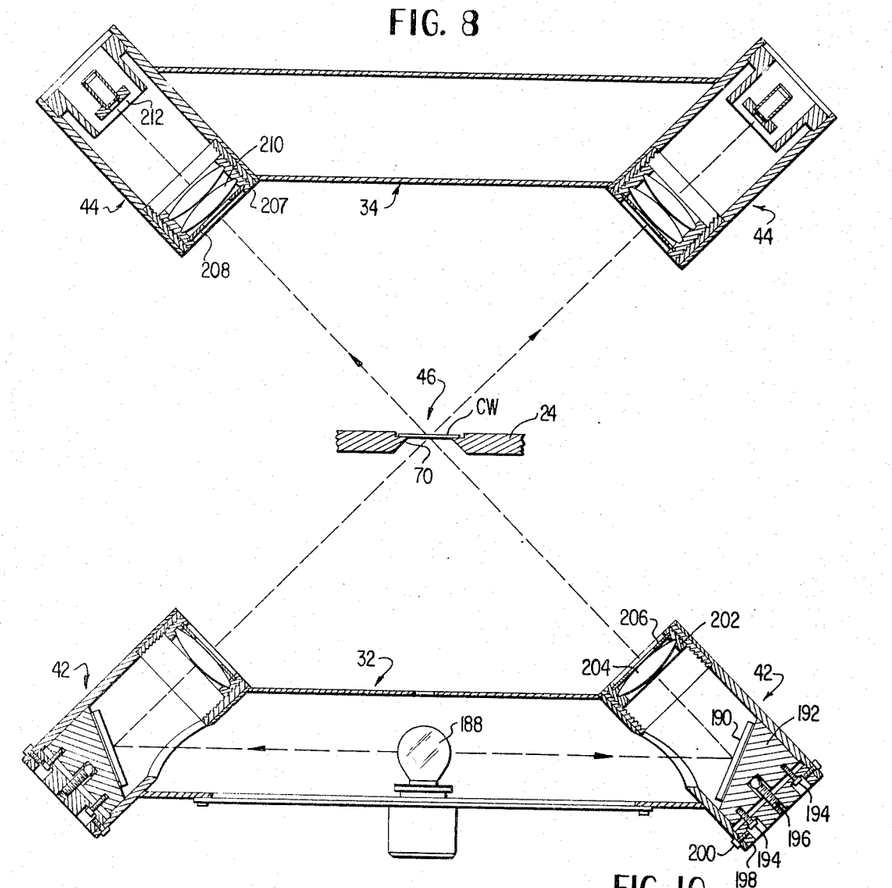
FIG. 8 is a sectional view illustrating a portion of the optical and detection system employed with this invention.
Figure 9:
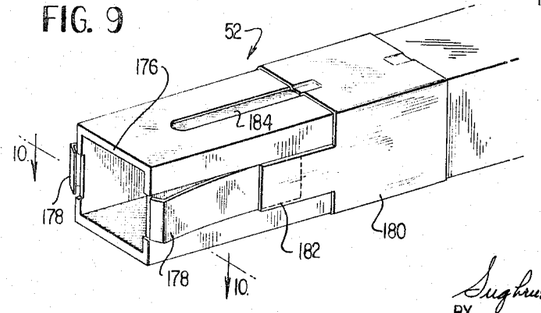
FIG. 9 is a perspective view of a blank collecting magazine utilized in this invention.
Figure 10:
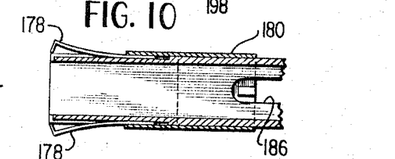
FIG. 10 is a detailed sectional view through the end of the blank collecting magazine of FIG. 9.

The optical and photoelectric detecting system is best shown in FIGS. 4 and 8. Light is provided by on ordinary source of light such as a lamp bulb 188 within the light housing 32 and light from this bulb radiates towards tubes 42, 42, 42, 42. Each of the four tubes 42, 42, 42 42 is identical and, therefore, only one will be described. Each tube includes a mirror 190 mounted on a support 192 and positioned to reflect the light toward the detecting station 46 across the corner of the crystal blanks CW and through window 70. A mirror support 192 is adjustable for the purpose of adjusting the reflected light beam, the adjustable means including screws 194, 194 and 196 mounted in tube end 198, the tube end being secured to the tube by screws 200. By this means the mirror can be adjusted for directing the beam of light precisely as desired, the screws 194 provided for tilting in the screw 196 for axial positioning of the mirror 190. The other end of tube 42 mounts an adjustable carrier 202 for a lens 204 of the condensing type and a polarizer 206.

After passing through and across the corners of the crystal wafer CW each beam of light passes into tubes 44 of photocell housing 34, there being one tube 44 opposite each light tube 42. Since each tube 44 is identical, only one will be described. Each tube 44 includes an adjustable mounting collar 207 for a polarizer 208 and a pair of condensing lenses 210. These lenses direct the beam of light on to a photocell assembly 212 which includes a pair of photocells mounted in a bridge circuit to be described in FIG. 13. The mounts 202 and 207 allow the polarizers 206 and 208 to be rotated during initial set-up for maximum light extinction.

The optical arrangement is schematically illustrated in the lower half of FIG. 4 and as can be seen light from lamp 188 is directed outwardly in all directions at the same intensity and four of the rays directed toward mirrors 190, 190, 190, 190 are illustrated by the solid line arrows. Reflected light from the four mirrors passes through and across the corners of the crystal wafer CW at detecting station 46. In FIG. 4 the reflected polarized light until it gets to the wafer is indicated by the dash lines. After the reflected light goes through the wafer it is changed in polarization depending upon the position of the +X-axis of the crystal and the four beams of light passing across the corners of the wafer are directed on the four photocell assemblies 212a, 212b, 212c and 212d. The responses from the photocell assemblies are electrically connected to a control circuit 214. The control circuit in turn, and in accordance with the sensed response of the photocells, controls the drop solenoid 82, the first level switch solenoid 92 and the second level solenoid 106. A further switch 216 is actuated by cam 218 on the end of drive shaft 133 to correlate the mechanical, optical and sorting timing of the invention of this apparatus.

Figure 14:
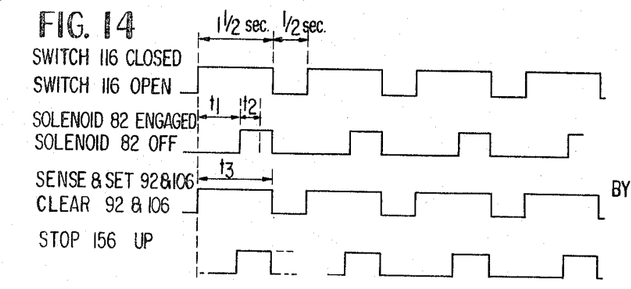
FIG. 14 is a timing diagram for the timing of the detecting, sorting and collecting functions of this invention.

The electrical circuit of this invention including control circuit 214 is shown in FIG. 13 while the timing diagram is shown in FIG. 14. Referring to these figures, and particularly in FIG. 13, there is shown an electrical input power source 220 which may be 110 volt A.C. which in turn is directed through a main switch 222 to a power supply circuit 224. This power supply circuit includes a main transformer 226 and a lamp transformer 228. The lamp transformer provides for lighting of the lamp 190 thereby furnishing the source of detecting illumination. The secondary from transformer 226 is connected to a bridge rectifier 230 and the circuit may advantageously include a pilot light 232 and filters 234, the latter being across the output of the rectifier 230.

A variable resistance 236 allows a contact 238 to pick off a D.C. control voltage to operate relays in accordance with unbalancing of photocell bridge networks. The drive motor 136 for the drive shaft 133 is powered from the output of the power supply through a three-position toggle switch 240. This switch is shown in its center off position and may be manually moved up or down for automatic or manual operation. Cam 218 controls the closing of switch 216. The circuit further includes silicon controlled rectifiers (SCR's) 246, 244 and 242 which control the energization of the coils of the drop solenoid 82, the first level switch solenoid 92, and the second level switch solenoid 106, respectively. A relaxation oscillation circuit 248 of known type includes an adjustable resistance 250 to control the delay from the time the sensing starts until the sensing is completed, the solenoids 106 and 92 are set and crystal blank CW is dropped from the detection station 46. This relaxation oscillator also includes a unijunction transistor 252, Zener diode 254 and the other resistances and capacitances as shown.

A control panel mounts various indicator lights including a sense indicator light 255 and indicator lights in the circuits for the solenoids as shown, such as drop indicator lamp 251, first level switch indicator lamp 257 and second level indicator lamp 259.

The photocell assemblies 212a, 212b, 212c and 212d, each including two photocells, are conducted in bridge circuits as shown to cause current to flow in a predetermined direction through relay coils 256, 256, 256, 256. Current flow through these relay coils controls the switch points 258a, 258a, 258b, 258b in making contact with points x and y. Adjustable resistance elements 260, 260, 260, 260 allow for adjusting the bridge circuits including the photocells 212a, 212b, 212c, 212d, to a balanced or null position.

The three-position toggle switch 40 includes a lower position for manual operation and an upper position for automatic operation. Assuming automatic operation, the switch 240 in its upper position, the circuit must be completed by the cam switch 216. As shown in the top line of FIG. 14, the cam switch is on for a certain period of time, for example 1½ seconds and is then off for a period of time, for example ½ second. After a predetermined time delay $t_1$ as shown in the second line of FIG. 14, the drop solenoid 82 is energized. The time delay $t_1$ is determined by the adjustable resistance 250 and the relaxation oscillator 248 controlling the time of energization of coil 82 through the silicon controlled rectifier 246. When solenoid 82 is energized, the crystal wafer CW is allowed to drop from the detecting station 46 and will drop along the chute tracks 58 or 60, 62, 64, 66 or 68 until it hits the stop finger 156. The physical dropping time for the crystal to the stop pin is illustrated as $t_2$ in the second line of FIG. 2. During the time delay $t_1$ the crystal while at detecting station 46 is sensed and the reception on the photocells 212, 212, 212, 212 varies in accordance with the position of the X-axis to unbalance the bridge circuits and cause current flow in desired direction through two of the relay coils 256, 256, 256, 256 which, in turn, cause contacts 258a and 258b to make points x or y and thereby selectively pulse the silicon controlled rectifiers 242 and 244, which in turn hold the solenoids 92 and/or 106 or until power is interrupted. The time for sensing and setting is illustrated as time $t_3$ in the third line of FIG. 4, that is sensing starts when switch 116 is closed and the SCR's hold the solenoids on until switch 116 opens. This allows setting of the switch blade 90 of the first level and the switch blades 102 and 104 of the second level of sorting. The stop 156 is put up while the crystal is falling during time $t_2$ to hold the crystal and while it is marked.

Figure 17:
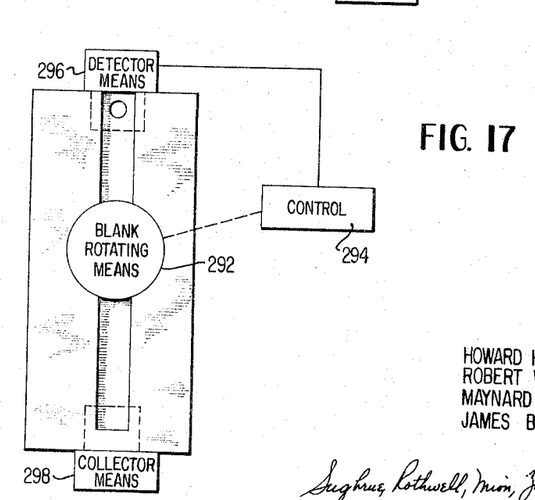
FIG. 17 is a schematic diagram of an additional embodiment of this invention utilizing both a single collecting station and a single sorting path with the control for orienting the blanks as they pass along the sorting path.

The logic circuit can be arranged in any desired fashion but, for example with the arrangement shown in FIGS. 3 and 17, a crystal having the +X-axis vertically downward would unbalance the photocell bridge circuits and so as to not energize either of the first or second level solenoids 92 and 106. That is, the photocell assemblies 212a and 212c would be darkest. Unbalancing of the bridge networks cause current to flow through relay coils 256, 256, 256, 256 to cause contacts 258 to make the y points. Tracing the circuit from wiper 238 it can be seen that neither SCR 242 or 244 is pulsed to energize either solenoid 92 or 106. On the other hand, to sort a crystal fed at random to the detecting station 46 in which the +X-axis was vertically up and to sort the crystal into track 66 both first and second level solenoids 92 and 106 would have to be operated in which case photocell assemblies 212a and 212b would be darkest causing current to flow through relays 256 to energize causing all contacts x to be made. Photocells 212b cause SCR 242 to hold solenoid 106 and photocells 212a causing pulsing of SCR 244 to operate and hold solenoid 92. To sort a crystal with the X-axis extending to the left as viewed in FIGS. 3 and 17 along track 62, then the second level of solenoid 106 would have to be energized only and this means that photocells 212b and 212c would be darkest causing closing of contacts 258b with x and 258a with y. Finally, if the X-axis of the crystal was detected to be to the right side as viewed in FIGS. 3 and 17, then only the top level of solenoid 92 need be energized in order to switch blade 90 and to sort the crystal down track 68. In this case, photocells 212a and 212d are darkest, causing current flow through coils 256 causing closing of contacts 258a with x and 258b with y. As can be seen from tracing the circuit this causes pulsing of SCR 244 operating solenoid 92.

The operation of the FIGS. 1–15 preferred embodiment will now be described. Crystal wafer blanks CW are fed from vibratory feeder 38 down chute 40 to detecting station 46. At detecting station 46 arm 72 allows only one crystal wafer blank CW to be in detecting position over window 70 at a time. As the blank is over window 70 light is directed from lamp 188 and reflected from mirrors 190 across the corners of the blank on to the four photocell assemblies 212a, 212b, 212c, 212d. Depending on the position of the +X-axis in the randomly fed blanks two adjacent photocell assemblies 212 will cause an unbalance of the bridge circuits causing current flow through the relay coils 256 in a direction to cause relay contacts 258a and 258b to set the solenoids 92 and 106 which in turn set the position of the switch blades 90, 102 and 104 to control which of the four tracks 62, 64, 66, 68 of the crystal will fall down. As the crystal falls down one of the tracks it is stopped by the stop finger 156 operated from the main drive shaft 133 and the marker bar 142 comes down causing the marker assemblies 140, 140, 140, 140 to mark the crystal in accordance with the particular track it is in. The marker bar 142 and the stop finger 156 are then retracted allowing the sorted and marked crystal wafer blank to pass to the bottom of its resective track at which time cam 134 feeds the crystal wafer blank CW into a magazine 52. After the magazines 52 are near full with sorted wafers, the entire magazine may be removed from the machine by sliding slide 180 down causing fingers 178 to close under the lowest crystal in the magazine unscrewing screw 130 to free the clamp for the magazine. Thus the sorted crystal wafer blanks with like orientation of their +X-axis may be processed further, e.g. by determining the Z-axis by X-ray methods using the +X-axis as a reference.

Figure 16:
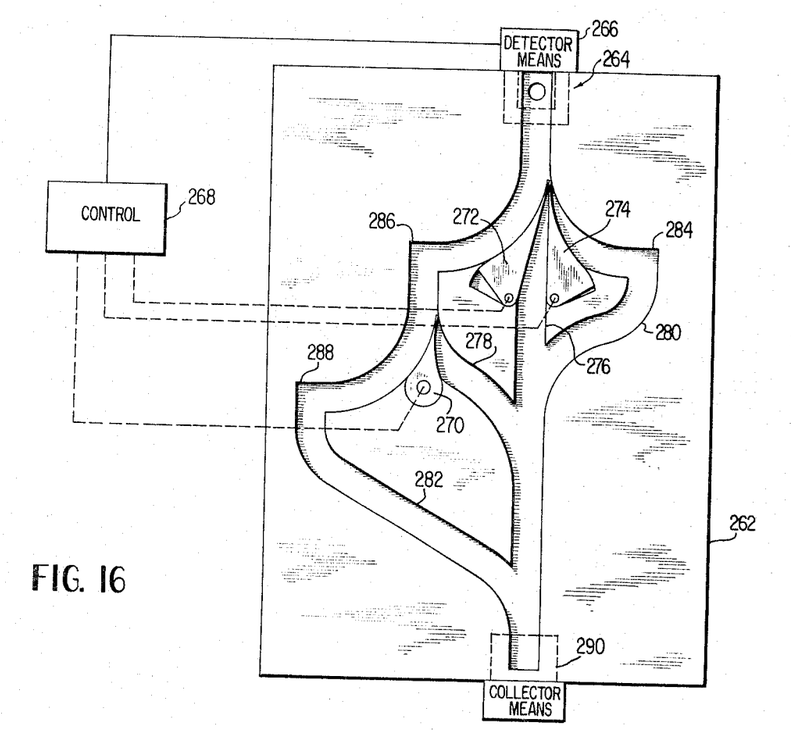
FIG. 16 is a schematic view of a further embodiment of this invention utilizing only a single collecting station with multiple sorting paths.

Although the invention has been described broadly and specifically with regard to a preferred embodiment in which there is a single detecting station, four selective sorting chutes or conveyer paths and four collecting stations in the collecting means, it is within the scope of this invention to apply the inventive principles to crystal wafer sorting arrangements shown in FIGS. 16 and 17.

In FIG. 16 a sorting board 262 similar in position and function to sorting board 24 of the FIGS. 1–15 embodiment includes a detecting station 264 with detector means to 66 similar to that of the previously described embodiment. The detector means operate a control circuit 268 which in turn sets switches 270, 272, 274. These switches control whether or not a crystal wafer blank heads vertically straight down along path of the chute conveyer path 276 of the chute conveyer, or is rotated 90° and heads down path 278, or is rotated 90° in the other direction to go down path 280, or is rotated 180° to go down path 282. As can be seen, each of the right angle turns 284, 286 and 288 of the chute conveyer provide for turning the blank 90° from its position at the detecting station 264. With this arrangement the detected +X-axis of the crystal wafer is sensed by the detector means that controls the control means 248 to determine which of the paths the blank travels down to a collecing means 290. The collecting means may be similar to the collecting means 50 of the prior described embodiment.

FIG. 17 shows an arrangement further utilizing the principle of this invention and the principle of FIG. 16 with the exception that instead of having four separate sorting paths controlled by switches there is only a single sorting path together with a means 292 to rotate the blank in accordance with detection of the X-axis and under the control of a control circuit 294 which is responsive to the detecting means 296. With the blanks rotated so that the X-axis of each blank is in the same position whether, no matter what the position, then all blanks will be similarly oriented when they reach a collecting means 298.

Although in the preferred embodiment the blank is held stationary and four beams of light are used at the detecting station, it is within the scope of this invention to automaticaly rotate the blank at the detecting station with respect to a single beam of polarized light.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An apparatus for detecting the +X-axis of quartz crystal wafer blanks and for collecting the blanks in accordance with the determination of the +X-axis, the apparatus comprising; a detecting station for a quartz crystal wafer blank, polarized light and photoelectric detecting means for detecting the +X-axis of the quartz crystal wafer blank at the detecting station, a blank collecting means, at least one path for passage of the blank leading from the detecting station to the blank collecting means, switch means in said path, automatic electro-mechanical means responsive to the +X-axis detecting means for controlling the switch means and thereby controlling movement of the blank on passage of the blank along the path from the detecting station to the collecting means so that all blanks with the same +X-axis orientation are collected together at the collecting means.

2. An apparatus as defined in claim 1 wherein there are at least four sorting paths for movement of the blank and the automatic electro-mechanical control means controls the movement of the blank into a selected one of these sorting paths.

3. An apparatus as defined in claim 2 wherein the collecting means includes four separate collecting stations, one for each of the sorting paths.

4. An apparatus as defined in claim 2 wherein the collecting means is a single collecting station and the four separate sorting paths lead to the single station.

5. An apparatus as defined in claim 1 wherein there is a single sorting path and the collecting means is a single collecting station and the switch means selectively rotates the blank on the single path between the detecting station and collecting station so that all blanks at the collecting station have the same +X-axis orientation.

6. An apparatus as defined in claim 1 further comprising means for feeding a blank to the detecting station and means for holding one blank at a time at the detecting station.

7. An apparatus as defined in claim 1 wherein the polarized light and photoelectric detecting means for detecting the +X-axis includes a source of polarized light directed through the blank onto photoelectric light responsive means positioned on the other side of the blank.

8. An apparatus as defined in claim 7 wherein the source of light is directed in four separate light beams through the blank while the blank is at the detecting station and on to photoelectric cells positioned on the other side of the blank in alignment with the four beams of light.

9. An apparatus as defined in claim 8 wherein the four beams of light pass across the corners of a square blank and wherein there are two photocells for each beam of light.

10. An apparatus as defined in claim 9 wherein the means for detecting the +X-axis further includes bridge circuits connected to the photocells and unbalanced by photocell response in accordance with +X-axis of the blank to operate the control means for setting the means for selecting the alternate paths for the blank.

11. An apparatus as defined in claim 1 wherein there are four sorting paths in the form of individual chutes in a tree arrangement with the top of the tree being at the detecting station, the four chutes terminated at four collecing stations constituting the collecting means and a removable blank holding magazine is positioned at each collecting station.

12. An apparatus as defined in claim 11 wherein the automatic electro-mechanical control means for selecting one of the sorting paths comprise blades movable at junctions in the tree arrangement of the paths.

13. An apparatus as defined in claim 12 wherein there are two levels of blades in the tree arrangement with one blade at an upper level and a pair of commonly operated blades at a lower level.

14. An apparatus as defined in claim 13 wherein each level of blades is operated by a solenoid which in turn is part of an electrical circuit constituting a portion of the automatic electro-mechanical control means responsive to the detecting means.

15. An apparatus as defined in claim 1 further comprising automatically operated marking means for marking each blank in accordance with the +X-axis detection and operable while each blank is in the sorting path leading to the collecting means.

16. An apparatus as defined in claim 15 wherein the marking means comprises a marker adjacent each of four separate sorting paths, means connecting each marker for common actuation, and means actuating the markers after each blank moves from the detecting station toward the collecting station.

17. Apparatus for detecting the +X-axis of quartz crystal wafer blanks and for collecting the blanks in like groups in accordance with the detected +X-axis, the apparatus comprising; means for holding one quartz crystal wafer blank at a time at a detecting station for +X-axis detection, a +X-axis detection means including a source of polarized light at the detecting station on one side of the blank and photoelectric means at the detecting station on the other side of the blank for detecting the +X-axis of a blank at a time while the blank is held stationary by the holding means, a path means for movement of the blank leading from the detecting station, blank collecting means at the other end of the path means, switch means in the path means, and means responsive to the +X-axis detecting means for controlling the switch means thereby controlling movement of the blanks between the detecting station and collecting means along the path means to provide that all blanks having like +X-axes are collected together by the collecting means.

18. A method for detecting the +X-axis of quartz crystal wafer blanks, orientinng and collecting the blanks in accordance with the direction of the detected +X-axis, the method comprising; feeding one quartz crystal wafer blank at a time in random with the +X-axis undertermined to a detecting station, detecting the +X-axis of the quartz crystal wafer blank at the detecting station, passing the blank after detection of the +X-axis toward a collect- in gstation, orienting the blank during movement of the blank in accordance with and in response to the detection of the +X-axis and collecting the blanks after the orienting so that all blanks having like +X-axes are collected together.

19. A method for detecting the +X-axis of quartz crystal wafer blanks, sorting and collecting the blanks in groups in accordance with the direction of the detected +X-axis, the method comprising; feeding one quartz crystal wafer blank at a time having unknown +X-axis direction to a detecting station, detecting the +X-axis of the quartz crystal wafer blank at the detecting station, passing the blank after detection of the +X-axis toward a collecting station, sorting the blank into separate passages during its passage toward the collecting station, and collecting the blanks in separate groups in accordance with the detection of the +X-axis so that all blanks having like +X-axes are together in separate groups.

20. A method as defined in claim 19 further comprising; automatically marking each blank with the location of the +X-axis in response to the detecting means after detecting the +X-axis and before collecting the blanks.

References Cited by the Examiner

UNITED STATES PATENTS

| | | | |
|---|---|---|---|
| 2,692,713 | 10/1954 | Silva | 198—31 |
| 2,889,941 | 6/1959 | Mehlis | 198—31 |
| 2,904,163 | 9/1959 | Golding | 198—21 |
| 2,947,406 | 9/1960 | Hazelton | 198—33 |
| 3,038,607 | 6/1962 | Eckert | 198—31 |
| 3,068,362 | 12/1962 | Ruocchio et al. | 240—22 |

FOREIGN PATENTS 610,626    12/1960    Canada.

EVON C. BLUNK, *Primary Examiner.*

R. E. AEGERTER, *Assistant Examiner.*